United States Patent
Green et al.

[11] Patent Number: 5,949,762
[45] Date of Patent: *Sep. 7, 1999

[54] APPARATUS AND METHOD FOR PROCESSING MULTIPLE TELEPHONE CALLS

[75] Inventors: Douglas E. Green, Eliot, Me.; Kenneth D. Jones, Atkinston, N.H.; Rick Peralta, Clinton; Frank O. Voellmann, Acton, both of Mass.; Bruce Osler, Hudson, N.H.; Grant Grummer, Sudbury, Mass.

[73] Assignee: Telebit Corporation, Chelmsford, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/686,990

[22] Filed: Jul. 25, 1996

Related U.S. Application Data

[63] Continuation-in-part of application No. 08/590,991, Jan. 24, 1996, abandoned.

[51] Int. Cl.[6] .................................................. H04L 12/16
[52] U.S. Cl. ............................................ 370/259; 375/222
[58] Field of Search .................................... 370/259, 359, 370/419, 465, 466, 467; 375/222

[56] References Cited

U.S. PATENT DOCUMENTS

| | | | |
|---|---|---|---|
| 4,025,904 | 5/1977 | Adney et al. | 340/172.5 |
| 4,578,796 | 3/1986 | Charalambous et al. | 375/8 |
| 4,620,294 | 10/1986 | Leung et al. | 364/900 |
| 4,794,517 | 12/1988 | Jones et al. | 364/200 |
| 4,922,534 | 5/1990 | Gorniak et al. | 380/49 |
| 5,027,273 | 6/1991 | Letwin | 364/200 |
| 5,128,943 | 7/1992 | Tulpule et al. | 371/9.1 |
| 5,170,470 | 12/1992 | Pindar et al. | 395/275 |
| 5,175,853 | 12/1992 | Kardach et al. | 395/650 |
| 5,274,826 | 12/1993 | Kardach et al. | 395/725 |
| 5,276,888 | 1/1994 | Kardach et al. | 395/725 |
| 5,283,869 | 2/1994 | Adams et al. | 395/200 |
| 5,291,604 | 3/1994 | Kardach et al. | 395/725 |
| 5,339,437 | 8/1994 | Yuen | 395/700 |
| 5,353,338 | 10/1994 | Nakano et al. | 379/99 |
| 5,473,763 | 12/1995 | Stewart et al. | 395/375 |
| 5,497,373 | 3/1996 | Hulen et al. | 370/259 |

*Primary Examiner*—Melvin Marcelo
*Attorney, Agent, or Firm*—Cesari and McKenna LLP

[57] ABSTRACT

An apparatus for processing telephone calls is connected between a primary rate ISDN (PRI) telephone line and a host computer. Telephone call data is transferred between the host computer and remote analog, basic rate ISDN (BRI) and/or PRI remote sites. The apparatus includes a digital signal processor that can run multiple signal processing sessions simultaneously and a control processor that can run multiple control processing sessions simultaneously. The apparatus can therefore process multiple telephone calls of one or more types simultaneously.

11 Claims, 7 Drawing Sheets

APPARATUS AND METHOD FOR PROCESSING MULTIPLE TELEPHONE CALLS

RELATED APPLICATION

This application is a Continuation-in-Part application of U.S. patent application Ser. No. 08/590,991, filed Jan. 24, 1996, now abandoned, which is incorporated herein in its entirety by reference.

BACKGROUND OF THE INVENTION

In present telephone communications systems, digital communication can be implemented on a T1 or E1 telephone line and can be processed in accordance with primary rate ISDN (PRI) protocol. Under PRI processing, digital data is transmitted serially on a T1 line in twenty-four serial channels (or on an E1 line in thirty-two channels). In T1 communication, twenty-three of the channels are data channels and the twenty-fourth channel is a control channel used for call set-up and maintenance. In E1, thirty data channels and two control channels are used. Data for each of the channels is time multiplexed over the T1/E1 line and is transmitted over the line in serial data packets, with a data packet for each channel being transmitted periodically every twenty-four/thirty-two packets.

The individual data packets are processed in accordance with the type of communication originating on the corresponding channel. For example, data for a telephone call to or from an analog modem can be converted to analog modem format and then transmitted. Alternatively, a call generated under basic rate ISDN (BRI) can be forwarded to a BRI terminal adapter which will convert the digital data to ISDN format accordingly.

The conversion to/from raw digital T1/E1 data can be performed by the local telephone company's central office before the translated data is sent to the recipient. Alternatively, the raw T1/E1 data can be connected directly to a user. The user can apply the data to a PRI interface which splits the raw data into appropriate channels. The data can then be processed according to the format in which it was originated, e.g., analog (voice), BRI, etc.

Conventionally, regardless of whether the call is analog or digital in origination, each call is processed by a separate device. For example, for BRI calls, each call must be individually routed to a separate BRI terminal adapter. Likewise, for voice calls, each call must be routed to its own individual modem. Hence, in conventional systems, in order to process multiple telephone calls simultaneously, the system must include as many terminal adapters and/or modems as there are channels to be simultaneously processed. In situations where the system is expected to process many telephone calls simultaneously, for example, an Internet service provider, the hardware requirements can be extraordinary.

SUMMARY OF THE INVENTION

The present invention is directed to a modem and a method for processing data for multiple telephone calls on a telephone line simultaneously. The modem of the invention includes a line interface for coupling the modem to the telephone line and a computer interface for coupling the modem to a host computer. A processor or processing system is coupled between the line interface and the computer interface to process telephone call data flowing between the line interface and the computer interface. The processor formats data for multiple telephone calls simultaneously.

In another aspect of the invention, the present invention is directed to a modem comprising a line interface for coupling the modem to a telephone line and a computer interface for coupling the modem to a host computer. The modem also includes a digital signal processor (DSP) coupled between the line interface and the computer interface for processing telephone call data flowing between the line interface and the computer interface. The DSP modulates and demodulates telephone call data transmitted over the telephone line during a signal processing (SP) session. The DSP is capable of carrying out multiple SP sessions simultaneously and therefore can process and format data for multiple telephone calls simultaneously.

In another aspect, the invention is directed to a modem which includes a line interface for coupling the modem to a telephone line and a computer interface for coupling the modem to a host computer. This aspect of the modem of the invention also includes a control processor which generates command and control signals used to control the various subsystems of the modem and carry out data conditioning functions such as error correction during the processing of telephone call data. The control processing of a single telephone call is referred to as a control processor (CP) session. In this aspect of the invention, the control processor is capable of carrying out multiple CP sessions simultaneously and, therefore, is capable of carrying out the control processing necessary to process and format control signals for multiple telephone calls simultaneously.

In one embodiment of the invention, each digital processor is capable of performing two SP sessions simultaneously and, therefore, can process two telephone calls simultaneously. In this embodiment, the control processor is capable of carrying out six CP sessions simultaneously. Therefore, by combining three DSPs and a single control processor, six telephone calls can be processed simultaneously.

Another aspect of the invention is directed to a multiple-modem module capable of processing multiple telephone calls simultaneously. The module includes a DSP capable of carrying out multiple SP sessions simultaneously. The module also includes a control processor capable of carrying out multiple CP sessions. The module therefore can be used as a modem capable of performing all processing required for multiple telephone calls simultaneously.

In one particular embodiment, the multiple-modem module includes three DSPs, each capable of performing two SP sessions simultaneously. The module also includes a single RISC processor which serves as the control processor, capable of performing six CP sessions simultaneously. Hence, in this embodiment, the multiple-modem module, also referred to as a "hex module," is capable of processing six telephone calls simultaneously.

In one embodiment, a modem board includes multiple hex modules. In one particular embodiment, five modules are included, enabling the processing of up to thirty channels simultaneously. In this embodiment, the modem can handle all data for a single T1 or E1 PRI telephone line.

In one embodiment, the invention is also directed to a board or card that includes the five hex modules. By connecting a T1/E1 ISDN line to the board through a PRI interface board, the board can process all channels of PRI data simultaneously, since the board has the capability of processing thirty telephone calls simultaneously.

The technology embodying the present invention is referred to herein as "Modem/ISDN Channel Aggregation" (MICA™) technology. The MICA™ technology reduces system complexity by taking telephone signals directly from the telephone network in native digital form. This eliminates the need for external digital-to-analog and analog-to-digital conversion components required in the conventional modem clusters, also reducing cost and component complexity.

Another aspect of the invention is an application programming interface (API) standard used to access both the digital modem capability and ISDN processing equipment of the modem. By using this programming standard, software drivers and applications running in a host computer can make use of a well defined mechanism for communications over ISDN lines, without the need to know what particular hardware implementation is being used.

The MICA™ API provides an abstraction of modem and ISDN services that is independent from the underlying telephone network and from the specific hardware adapters used to connect to the telephone network. The MICA™ API enables drivers and applications to access digital modems and ISDN adapter boards in a straightforward manner and allows unrestricted use of their functions through a standardized software interface. It provides an easy-to-use interface for applications and offers access to different services like data, voice, fax, video, telephony, etc. Drivers and applications that use this interface will not be affected by future expansions or hardware changes. The MICA™ API makes the changes transparent to drivers and user applications. The MICA™ API is described in more detail in U.S. Provisional patent application Ser. No. 60/022,812 entitled "Modem/ISDN Channel Aggregation," filed on even date herewith, of common assignee, which is incorporated herein in its entirety by reference.

Another feature of the MICA™ modem engine is the MICA™ command/data software interface. It dispenses with the standard "AT" command set associated with conventional modems. The MICA command/data interface provides out-of-band command and control in contrast to the AT in-band method (Hetherington+++ with guard time, etc.). The MICA™ command/data interface provides a straightforward matrix of commands and parameters which greatly simplify the programming interface, e.g., the MICA™ API mentioned above. It also allows real-time retrieval of modem status enabling robust and easy implementation of network management through SNMP or other methods. The MICA™ command/data interface is described in detail in the U.S. Provisional Patent Application incorporated above.

Another feature of the invention is the concept of port processing. The concept of port processing is to utilize the per-port processing elements currently employed exclusively for modem functions and to add an evolving set of non-modem communications processing features to enable a common remote access port to support ISDN, modem, cable modem, ADSL and other remote access protocols. The current state of the art requires unique individual port elements that are specifically designed to support a particular protocol. Port processing is also intended to off-load the processing that is conventionally done by the router or in dedicated hardware in conventional modems, such as, point-to-point protocol (PPP) encapsulation and compression.

As noted above, the MICA™ technology also runs multiple (six, in one embodiment) modem control sessions per RISC processor. As with the DSPs, the underlying technology can be scaled to perform many more modem sessions per processor. Enhancements to the control session procedure include unique pointer mapping methods in data compression, loop and look-up methods in a high-level data link control (HDLC) engine of the invention, and others.

The hardware HDLC engine of the invention provides further enhancements to density and performance of the control software. One innovation is the capability of running the HDLC on short bursts of data that do not represent complete data packets, and doing this on several data streams at once. Another innovation is the specific job distribution between the hardware and software. The specific work done includes HDLC framing such as CRC calculation and transparency, bit-stuffing in addition to exception character detection and end-of-packet processing. The start/stop/restart-later capability is implemented through DMA hardware which, given an address pointer and some other set-up information, retrieves the context of the session, processes a small number of characters and re-saves the context of the session. The HDLC engine of the invention is described in detail in the U.S. Provisional Patent Application incorporated above.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF THE INVENTION

Figure 1:
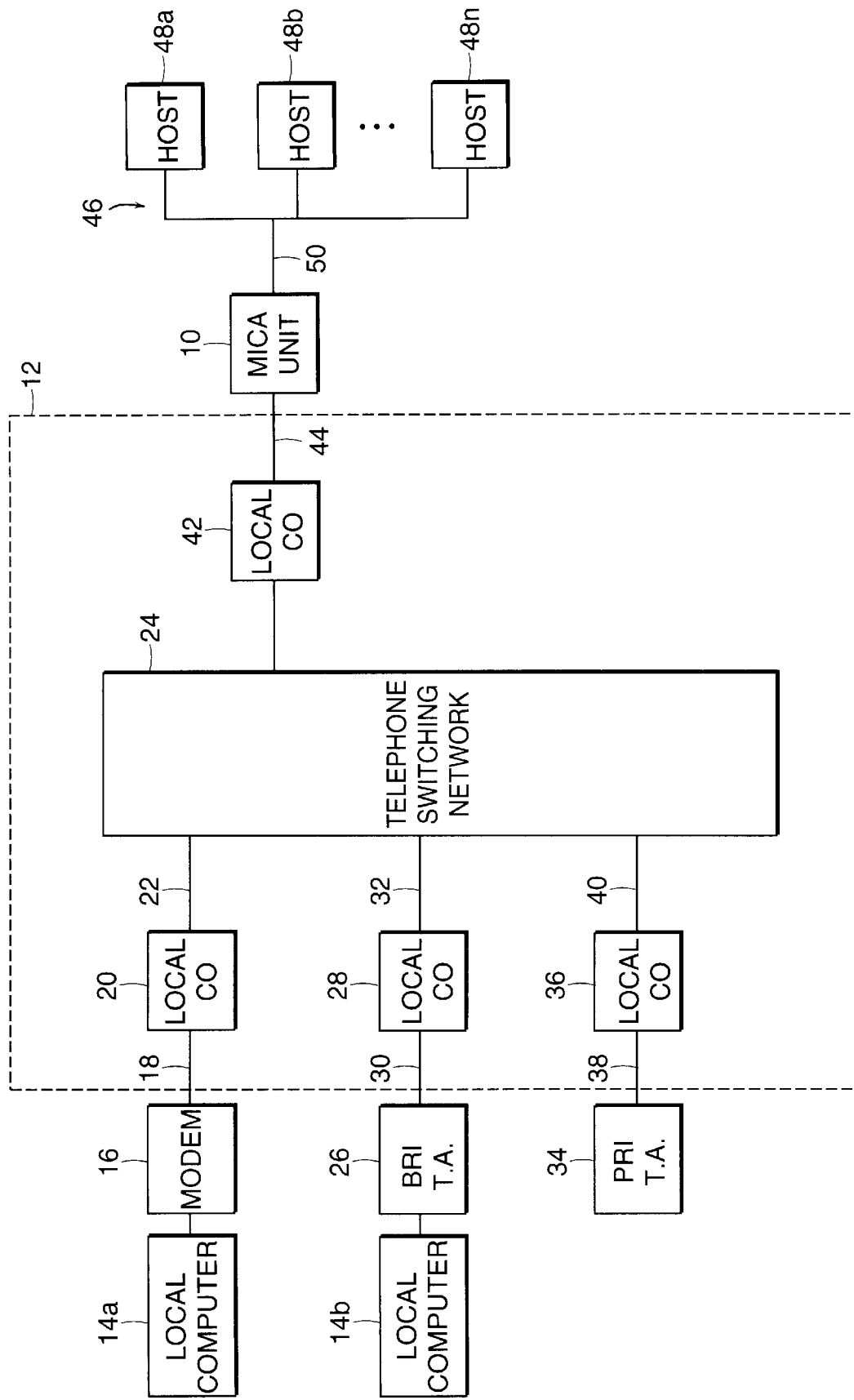
FIG. 1 is a schematic block diagram of one embodiment of the MICA™ telephone processing system of the invention connected in a telephone network.

FIG. 1 is a schematic functional block diagram of one embodiment of the MICA™ telephone processing unit 10 of the invention connected in a telephone network 12. The schematic diagram of FIG. 1 shows three examples of connections to the network 12. The first example shows a first local computer 14a connected to a conventional "analog" or "voice" modem 16. The modem 16 interfaces along analog telephone line 18 with a local telephone company central office (CO) 20. The CO can connect to a telephone switching network 24 by a line 22 such as a T1 digital line. It should be noted that the following description refers to the invention being applied to a T1 telephone line. It will be understood that the invention is also applicable to an E1 telephone line as well.

In another form of connection, a local computer 14b is connected via a basic rate ISDN (BRI) terminal adapter 26 to a local CO 28 via a BRI digital telephone line 30. Again, the local CO 28 can be connected to the telephone switching network 24 by a line 32 such as a digital T1 line. As is well known, BRI communication includes two data channels (B channels) and a single control channel (D channel) with data and control words transmitted serially in time-division multiplexed fashion.

In another form of connection, a primary rate ISDN (PRI) terminal adapter 34 is connected to a local central office 36 via PRI line 38. As is well known, PRI protocol includes 23 data channels (B channels) and a single control channel (D channel) also having control and data words transmitted in a serial time-multiplexed fashion.

The MICA™ unit 10 of the invention, like other connections to the telephone network 12, is connected through a local CO 42 to the telephone switching network 24. A digital PRI line 44 can connect the MICA™ unit 10 to the CO 42. The MICA™ unit can be connected to a host network 46 which routes telephone call data between the MICA™ unit and the various hosts 48a–48n connected on the network 46. The network can be a LAN interfaced to the MICA™ unit 10 via an Ethernet connection 50.

Hence, in accordance with the present invention, the MICA™ unit 10 can interface with the telephone network 12 via a T1 or E1 digital telephone line using PRI protocol. The MICA™ unit 10 processes telephone calls originated at a voice or analog modem 16, a BRI terminal adapter 26 or a PRI terminal adapter 34 and sent to a host 48a–48n or transferred from a host 48a–48n to any of those remote devices. The MICA™ unit 10 has the capability to receive and transmit calls of any data format.

Figure 2:
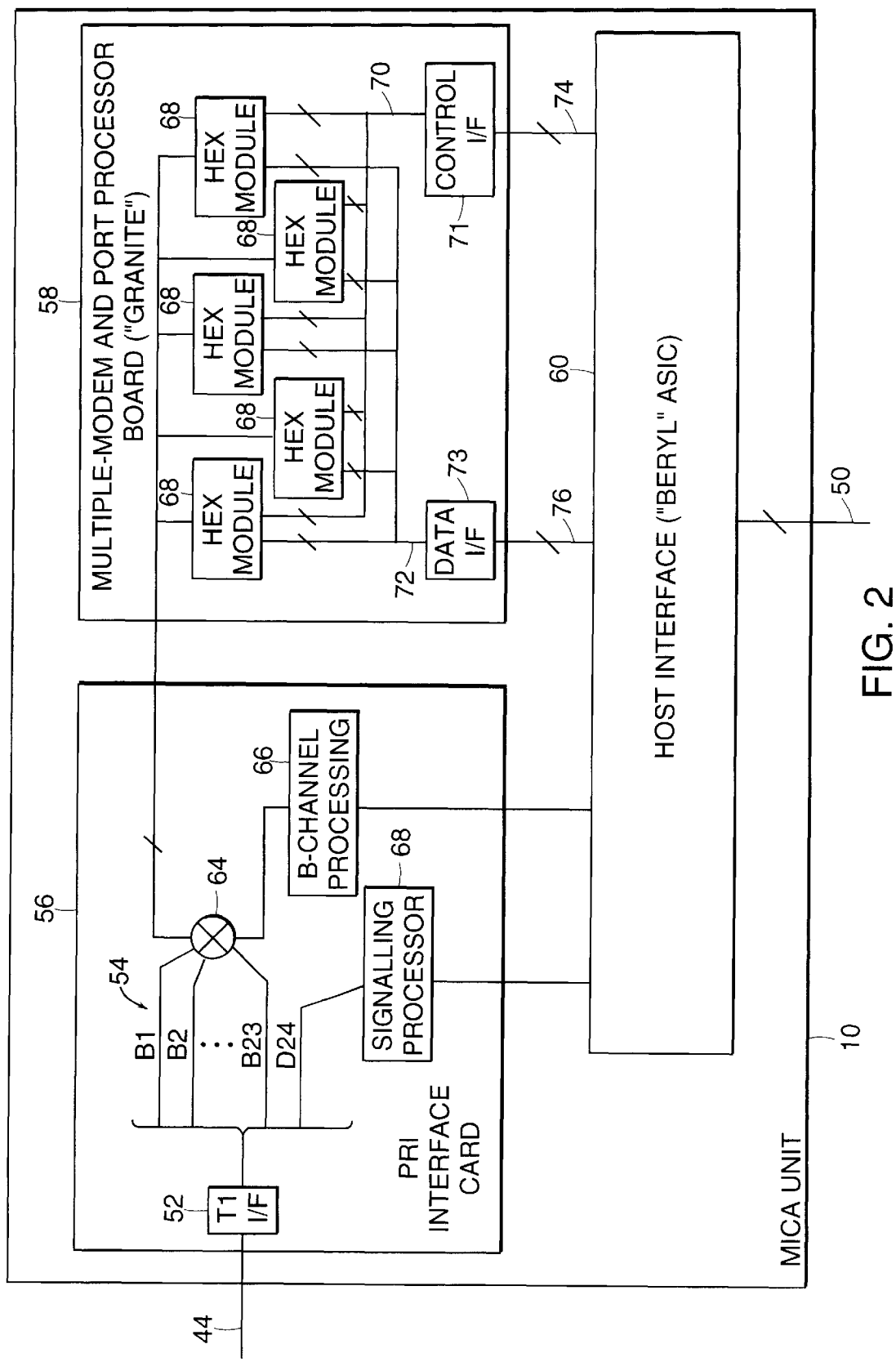
FIG. 2 is a schematic block diagram of one embodiment of the MICA™ telephone processing system of the invention.

FIG. 2 is a schematic block diagram of the MICA™ system 10 of the present invention. As indicated in the description of FIG. 1, the system 10 can be interfaced to a T1 telephone line 44. The system 10 includes a PRI interface card 56 which is connected to the T1/E1 line. The PRI interface card 56 can be a commercially available card such as a standard PRI interface card with standard ISA bus and computer telephony MVIP interface, for example, a PRI interface card supplied by Xircom, Inc. of Thousand Oaks, Calif.

The PRI interface card 56 in general receives PRI data on the T1/E1 line 44 and segments it into its twenty-four/thirty-two individual channels and outputs them to an appropriate recipient system based on telephone call formats. As indicated schematically in FIG. 2 and identified by reference numeral 54, twenty-three of the output channels are B data channels, and the twenty-fourth channel is a D signaling or control channel (in the case of a T1 line). The twenty-three data channels are routed to a switch 64 which, depending upon the type of telephone data, routes the appropriate data to the TDM bus 62 or through a B channel processing module 66 to a host interface 60.

A signaling processor 68 on the PRI interface card 56 performs the signaling and control using the D channel data. The D channel identifies the type of data carried by each of the B channels. Where signaling processor 68 determines that a particular B channel is carrying analog-originated data (voice), the switch 64 is set to route the data to the multiple-modem and port processor board (also referred to as the "Granite" board) 58 to process the data. Where the data of a channel is identified as being BRI or PRI data, it is routed through the B channel processing module 66 to the host interface. B channel processing includes digital processing such as rate adaption, HDLC processing, etc., which is performed on digital data before being transmitted to the host computer.

The host interface or ISA bus interface 60, also referred to as the "Beryl" circuit or ASIC, provides the hardware and software facilities for communication and command between the MICA™ system 10 and the host. It is described in more detail in the U.S. Provisional Patent Application incorporated above. ISDN data is processed and forwarded by the host interface 60 to a host 48 which can be connected on a LAN 46 (see FIG. 1).

Voice or analog-originated data is forwarded to the multiple-modem and port processor board (Granite board) 58 via TDM line 62. In one embodiment, the Granite board 58 includes a plurality of multi-modem "hex" modules 68, each of which is capable of processing data for a plurality of telephone call channels simultaneously. Each hex module receives and transmits command and control signals to and from the host interface 60 over an internal control bus 70 through a control interface 71 to a system control bus 74. Each hex module 68 is also connected to a data/address bus 72. Data and memory addresses are transferred across a data interface 73 to a data/address bus ("MICA Bus") 76 to the host interface 60.

The Granite board 58 is a highly dense, PC-based digital modem card based on the MICA™ technology. It can be used in a router with wide area network (WAN) and/or local area network (LAN) connections, though it is not limited to this type system. The WAN interface card transfers many channels of digital data to/from the Granite board 58 via the MVIP bus 62.

A host, e.g., the PC, exchanges data with the Granite board 58, performs a routing function and then passes it to its destination, possibly a LAN. It transfers this data over the industry standard ISA bus. It can take up a single slot in the PC chassis. The Granite board 58 performs most of the standard functions of an analog modem and can operate in accordance with the V.34 specification.

The Granite board 58, in one embodiment, is a thirty-channel digital modem card. Architecturally, it is made up of an ISA bus interface, an MVIP interface and five clusters of six-modem (hex) modules. Each hex modem module contains a RISC processor, three DSP processors, memory and enabling logic.

Figure 3:
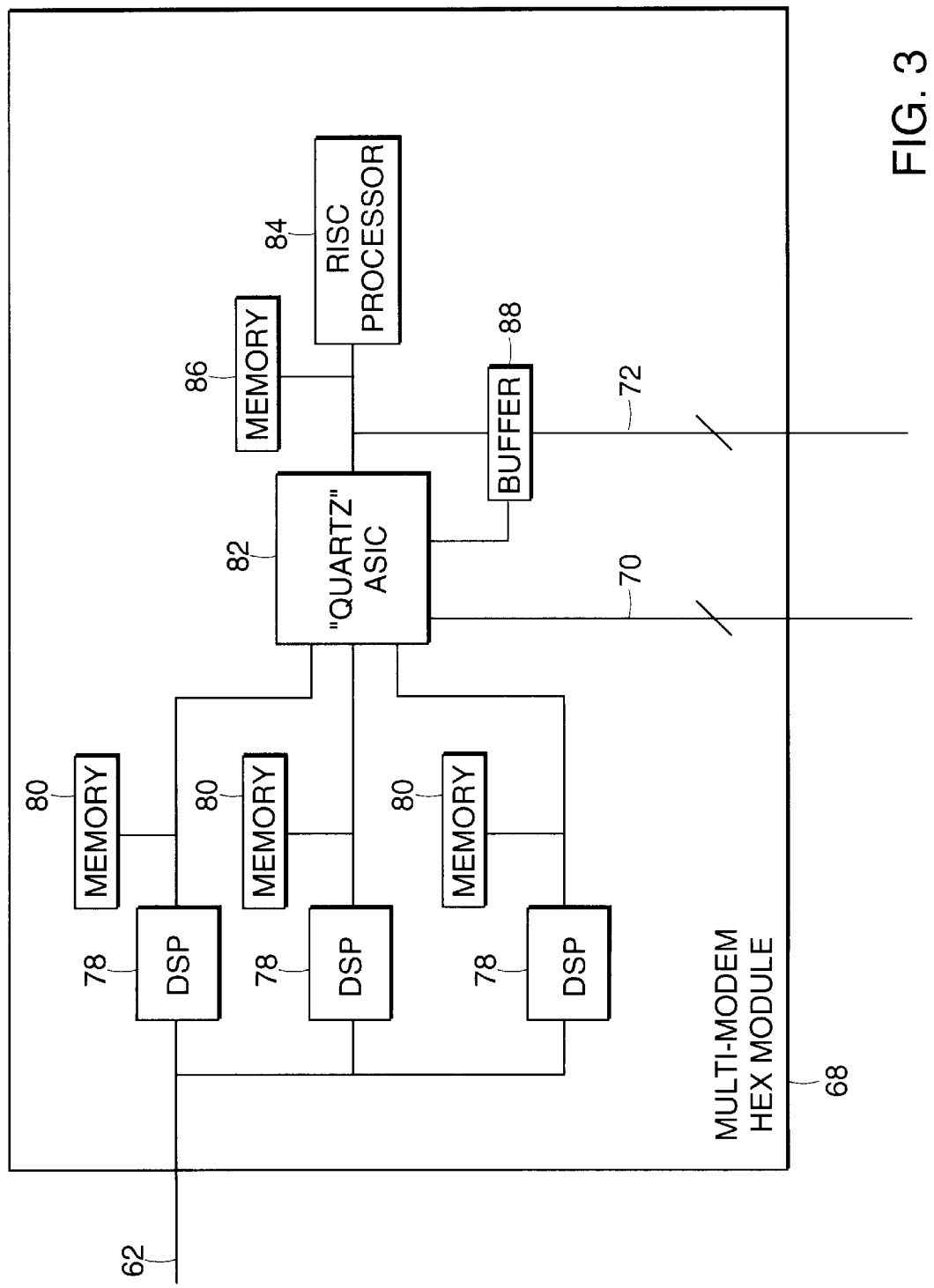
FIG. 3 is a schematic block diagram of one embodiment of the multi-modem "hex" module of the invention.

FIG. 3 is a detailed schematic block diagram of a single multi-modem hex module 68. The hex module receives as input serial TDM data from the TDM line 62. The data is applied to multiple DSP circuits 78. Data to and from the DSP 78 is applied to a "Quartz" ASIC 82, which provides data processing such as HDLC error detection and correction. The Quartz ASIC 82 is described in more detail in the U.S. Provisional Patent Application incorporated above. The Quartz ASIC 82 also transmits commands and control over the local command and control bus 70 (see also FIG. 2).

Each DSP 78 runs under the control of software stored in an associated memory 80 to perform signal processing tasks associated with processing telephone call data. For each telephone call, the DSP 78 and associated memory 80 work in conjunction to perform a signal processing (SP) session. In the present invention, each DSP 78 is capable of running two SP sessions simultaneously. Therefore, each DSP 78 can process data for two telephone calls simultaneously. Hence, the hex module 68 is capable of processing data for up to six simultaneous telephone calls.

The hex module 68 also includes a RISC processor 84 such as an Intel i960 processor which, in conjunction with associated memory 86, performs the tasks of a control processor for the modem. The processor 84 and memory 86 perform the tasks associated with control processing (CP) sessions such as data compression and expansion. In one embodiment of the invention, the processor 84 can perform CP sessions for six telephone calls simultaneously. Hence, with three DSPs 78 and a single RISC processor 84, the multi-modem hex module 68 is capable of processing data for up to six simultaneous telephone calls. Processed data is passed through buffer 88 to the data/address bus 72 (See FIG. 2).

Each hex module 68 includes a single RISC processor which can run six CP sessions. These sessions include monitoring the memory interface to the host, performing digital data compression/decompression and passing data to the DSPs or SP sessions. Each RISC processor 84 works in concert with the three DSPs 78. Each of the DSPs 78 runs two SP sessions. Each SP is used primarily as a modulator and demodulator and interfaces to the MVIP bus.

The ISA bus interface includes an ASIC (called "Beryl"). The Beryl ASIC moves data between the ISA bus and the memory 86 associated with the RISC processor 84.

The Quartz ASIC 82 on the hex module 68 assists in all the data passing between the RISC memory 86 and the DSPs 78. The Quartz ASIC 82 also assists in RISC memory control, arbitration for the RISC memory and CP coprocessor functions.

The data from six modem channels can be processed in one hex module 68. Two separate channels of this data are processed in each of the three DSPs 78. Each DSP 78 runs two SP sessions. The combined data from/to all these channels are processed by one RISC processor 84, which runs the six CP sessions.

After data is processed by an SP session, the data is moved through the Quartz ASIC 82 to the DRAM RISC memory 86, while the RISC processor 84 is placed in a hold or wait state. The RISC processor 84 determines that data has arrived by polling for status from the SP. The processor 84 then uses the coprocessors in the Quartz ASIC 82 to process the data or processes it by itself. If the Quartz ASIC coprocessor is used, it is programmed to move the processed data back to the DRAM memory 86, again putting the RISC processor 84 in a wait state. After this is done, the ISA bus polls the DRAM memory 86 for status, again putting the processor 84 in a wait state. The ISA bus then receives the data from the memory via the Beryl DMA engine, while again putting the RISC processor 84 in the wait state.

In one embodiment, each DSP 78 runs two SP sessions. The SP sessions share two 64 kW zero wait state SRAMs and I/O ports in the Quartz ASIC 82. The difference between each signal processing session is that each session controls a different data channel. Every non-boot-mode external access that the SP makes to data or program space accesses one of the two SRAMs. One SRAM is accessed during a program space access and the other is accessed during a data space access. Data space is further divided in half by the DSP's bus request line. An access to global space will access half the SRAM, while an access to standard data space will access the other half. An access to I/O space will access the SP registers in the Quartz ASIC 82.

As mentioned above, each RISC control processor 84 can run six CP sessions. The CPs share two 256 kLW long words (32-bytes) of DRAM, coprocessor(s), an HDLC controller and I/O registers in the Quartz ASIC 82. Each CP session controls a different data channel.

The Quartz ASIC 82 contains a bus arbitrator, DRAM controller, DMA engine(s), coprocessor(s), HDLC controller (HDLC framer and HDLC deframer), MVIP time slot allocator, SP registers and CP registers. The bus arbitrator is used to control access to the DRAM. The RISC processor 84, DSPs 78, coprocessor(s), DRAM refresh request and the ISA bus all contend for the DRAM. Arbitration for the DRAM is on a round-robin basis for the RISC processor 84, DSPs 78 and coprocessor(s). The ISA bus gets the DRAM as soon as possible after requesting it. If a Stall Indicate bit is set in the RISC's command register and the RISC 84 asserts a BSTAT line, the RISC 78 becomes the second highest priority after the ISA bus.

Once the arbitrator selects the ISA bus, a DSP 78 or coprocessor(s), it places the RISC 84 in hold. Once the RISC 84 is in hold, the selected device uses its DMA engine to transfer data to/from DRAM.

The ISA bus DMA is located in the Beryl ASIC. It drives all the command and data lines that the RISC 84 would normally use to access DRAM. The DSPs 78 and the coprocessor(s) use the DMA engine built into the Quartz ASIC 82.

The DRAM controller supports single, burst and atomic transaction RISC 84 memory operations. The RISC 84 is able to transfer byte, word and long word data. The DSPs 78 can be limited to single word and burst transfers. The ISA DMA can be prevented from passing misaligned data. The ISA DMA should burst on quad-long word aligned boundaries.

The Granite board 58 can have at least two interfaces: the ISA bus and the MVIP bus. The ISA bus is the industry standard PC bus. The MVIP bus is made up of a set of eight serial multi-channel buses. Both of these interfaces reside almost exclusively in the Beryl ASIC.

The ISA bus interface includes the Beryl ASIC and a DIP switch. The DIP switch selects the ISA I/O address of the board. The Beryl ASIC provides the gateway that the ISA bus needs to access a RISC's DRAM. This interface is accessed through the ISA I/O and memory space. It is set up through the I/O space. Data and commands are passed through the memory space.

The Granite board 58 is a shared memory device which allows direct host access to each RISC's DRAM. A shared memory window in the host memory space is allocated to the board. This is then associated with the DRAM. The setting up of both the size and location of the memory window and its association with the DRAM is done through the I/O space. The I/O base address space is assigned to the board via a DIP switch. It has six positions which represent host address bits A9-A4.

The MVIP interface can be distributed throughout the Granite board 58. The allocation of a specific time slot to a specific DSP 78 is done in a Quartz ASIC 82. The selection of a specific MVIP serial line for the Granite board 58 is done in the Beryl ASIC 60. The selected MVIP serial line connects to the serial channel on every DSP 78. Every serial line consisting of both transmit and receive directions can carry thirty-two time-division multiplexed (TDM) channels or time slots. The Granite board 58 uses thirty of these, two to each DSP 78. The selection of the two channels for the DSPs 78 is done through a slot allocation register in the Quartz ASIC 82. The selection of the serial line is done through the MVIP select register in the Beryl ASIC 60.

The Beryl ASIC 60 contains the ISA bus interface, MVIP bus serial line select and DMA engine. The DMA engine is used to transfer data between the host (ISA) bus and the RISC DRAM 86. Buffers are located in each RISC's DRAM 86. They exist in a contiguous memory space of at least 4 k bytes. There can be any number of these contiguous memory spaces which need not be contiguous to each other. Management of these buffers is the responsibility of the software.

Data is transferred in and out of these buffers by a hardware DMA engine located in the Beryl ASIC 60. In order for the DMA engine to perform an operation, it must assemble the data first. Since the DMA doesn't know the full starting address of the data it must wait for the initial ISA bus access and extract the address. The DMA gets its high order address bytes from the DMA register and its low order bytes from the actual ISA bus address presented during the initial ISA bus access.

To do a read, the DMA waits for the data cycle to commence. Once the full address is received, the DMA gets the data from a RISC DRAM 86. Since the data cycle has already started, and there is a good a chance that the DMA cannot get immediate access of the DRAM, there is one additional wait state added to some ISA cycles. The DMA reads more data than requested by the ISA bus. This extra data can be stored in the Beryl ASIC 60 and supplied to the ISA bus if requested in a subsequent sequential access. Additional, ISA bus wait states are not added when this stored data is accessed.

An ISA bus read cycle causes at least one long word (4 bytes) of DRAM to be read. The number of long words read is directly related to the alignment of the data in a quad long word. If the read is to a byte or word in the first long word of a quad long word, then all four long words will be read in a burst access. If the read is to the second long word, then only the last three long words are read in a burst access. If the read is to the last long word, then only the last long word is read.

Write cycles do not add extra wait states to the ISA bus because the DMA temporarily stores the data before sending it to the DRAM. The DMA will assemble sequential data up to four long words before sending it to the DRAM. Whenever a quad long word boundary is reached, the DMA will write the stored data to DRAM, bursting it if appropriate. These writes will be handled in a manner which does not overwrite DRAM data that has not been accessed. If the last of a chunk of data transfer is not a quad long word in length, the data will remain in the DMA and will not be transferred to the DRAM unless one of the following events occurs: (1) the page register is accessed, (2) a read cycle to DRAM is issued, or (3) a 32-to-64 millisecond time-out expires.

To enable the DSP and control processor to process multiple SP and CP sessions simultaneously, the SP and CP sessions are each run as a sequence of specific tasks. In one embodiment, certain of the tasks are identified as being background tasks and are therefore run in a background session of the signal processing and control processing software. Other tasks are identified as foreground tasks and are run in foreground sessions of the software. An example of the use of background and foreground tasks in the context of echo cancellation in a modem is described in copending U.S. patent application Ser. No. 08/590,991, filed Jan. 24, 1996, now abandoned, entitled "Method for Echo Cancellation in Data Communications," by Kenneth D. Jones et al., which is the parent of the present application.

Another example of foreground and background tasks is described in the U.S. Provisional Patent Application incorporated above in the section entitled, "Running a Complete Modem on a Single Commercial Digital Signal Processor." In that system, both SP and CP sessions are implemented on a single DSP, with tasks being identified as either foreground or background tasks and being executed accordingly.

Figure 4:
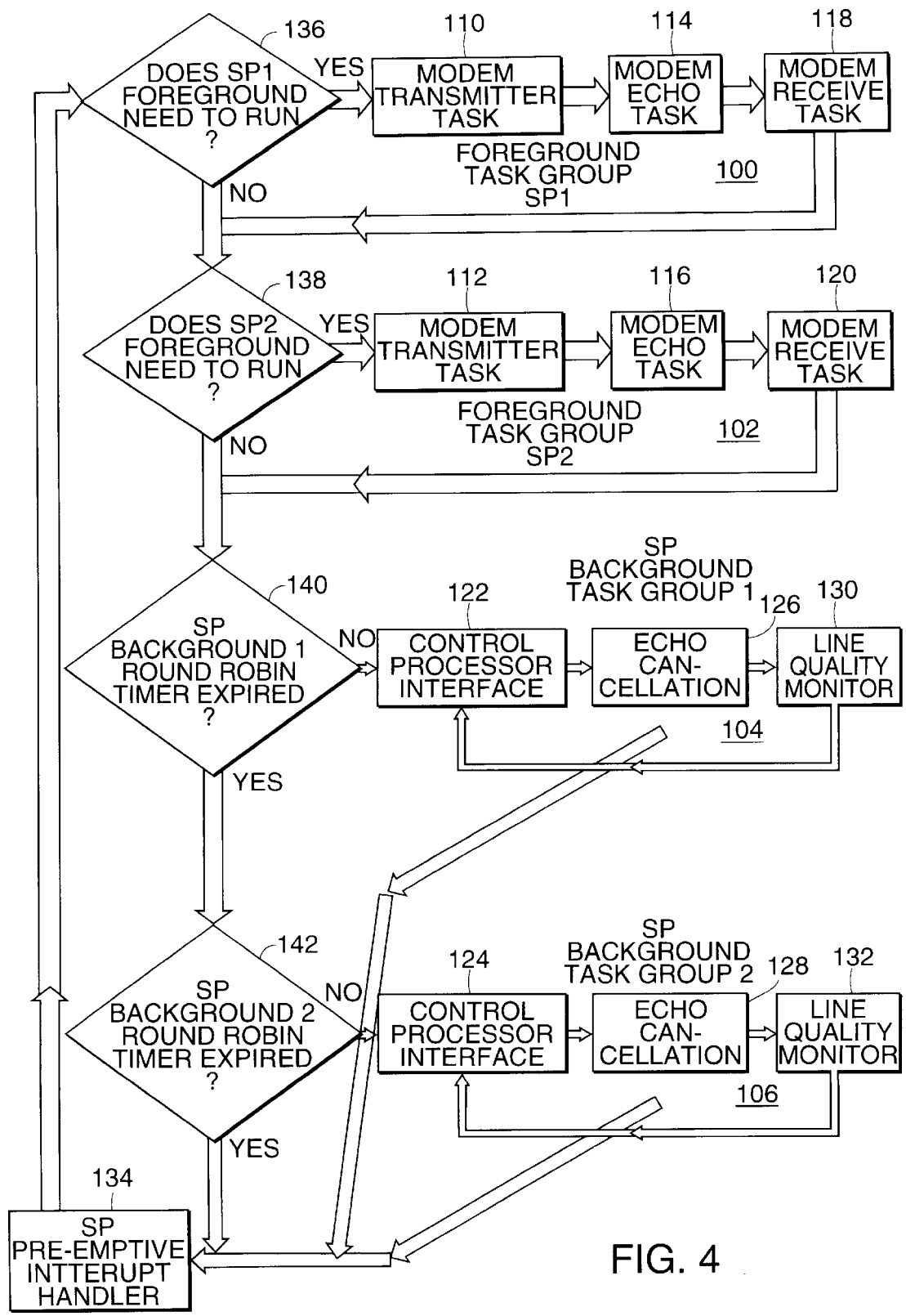
FIG. 4 is a schematic diagram illustrating the logical flow of signal processing sessions using multiple foreground and background task loops.

In the present invention, background and foreground tasks are implemented as described below to enable the system to process multiple calls simultaneously. FIG. 4 is a schematic diagram illustrating the logical flow of the background and foreground task loops executed by the invention to perform SP sessions.

The DSP processor runs a multi-threaded operating session which includes multiple foreground and background SP sessions. In the embodiment of FIG. 4, the procedure includes two foreground task groups 100,102 referred to as SP1 and SP2, respectively, and two background task groups 104,106. The foreground SP sessions 100,102 perform real-time modem tasks such as Modem Transmitter tasks 110,112 (including coding and modulation), Modem Echo tasks 114,116 (including receive filtering and echo removal), and Modem Receive tasks 118,120 (including equalization, demodulation, and decoding). The background SP sessions 104,106 perform non-real-time modem tasks such as Control Processor Interface tasks 122,124, Echo Cancellation adaptation 126,128, and Line Quality Monitoring 130,132.

The SP operating kernel operates in accordance with the following. The pre-emptive kernel suspends the currently running background task group 104 or 106 when the SP pre-emptive interrupt handler 134 runs. The interrupt handler 134 determines if any foreground task group 100 or 102 needs attention. These decisions are made in decision steps 136 and 138. If the first foreground task group 100 needs to run, the kernel swaps to the SP1 foreground task group 100 and it runs immediately. When the SP1 foreground task group completes, (or if it didn't need to run) the kernel checks in step 138 to see if the second foreground task group 102 needs to run, i.e., the SP2 foreground task group. If so, it swaps to SP2 foreground task group 102, and it runs to completion.

Once the foreground task groups 100,102 are completed, the kernel then uses the remaining time before the next pre-emptive interrupt to run the background tasks in a timed round-robin fashion in accordance with the following. After the last foreground completes, the kernel increments a timer tick and checks in step 140 to see if the previously suspended background task group (for example, SP Background Task Group 1) has reached its tick limit. If so, the next background task group (for example SP Background Task Group 2), is swapped in via the "yes" branch of step 140 and decision step 142 and runs until the next pre-emptive interrupt. Otherwise the previously suspended background task group (for example, SP Background Task Group 1) is resumed via the "no" branch of step 140 and continues. In either case, the presently running background task group 104 or 106 continues until the next pre-emptive interrupt, at which point flow transfers from the background loop 104 or 106 to the interrupt handler 134.

This method of utilizing spare background time for low-priority tasks such as echo cancellation adaptation automatically adjusts for the need for more echo cancellation adaptation MIPS during fast training mode, as described in the referenced parent patent application "Method for Echo Cancellation in Data Communications," by Kenneth D. Jones, et al.

The Control Processor or RISC Processor 84 performs the control functions of the modem. These include providing an interface between the host and the DSPs which synchronizes the sporadic host data flow to the required periodic data flow of the DSPs. That is, the possibly intermittent host data is converted by the CP session to a continuous periodic data stream.

The CP also performs error correction and data compression tasks to the data transferred between host and DSP. The error correction protocol used is described in detail in the Provisional Patent Application incorporated above in the "Quartz ASIC" section of the application.

In a modem, there are three primary criteria on which one can make a value judgment; they are compression capability, service latency (the amount of time it takes to propagate data through the modem), and product features such as error correcting and compression protocols supported.

In traditional modems, the architecture of the software is defined around the transmit (TX) and receive (RX) directions with foreground service routines for USART and signal processing, and background routines for the remainder. Modem latency and compression capability are therefore assured as long as the host processor has surplus computational capacity. There is usually little need to provide balancing between the two directions as they are both interface limited.

In the MICA™ modem module, the user interface is effected through shared memory organized as multiple half duplex channels, e.g., two directions per modem, six modems per Granite hex module. The rate of data transfer in/out of these interfaces is only limited by the capability of the modems to compress/pass the data and by the host/Granite bus bandwidth. If one were to simply port the traditional modem technology into the MICA™ modem environment, the result would congest as soon as one logical session had a large block of data to process. This congestion would result in unnecessary increases in data latency and drops in data throughput. In order to provide balance between the instantaneous needs, i.e., data latency, of any individual logical link (a given direction of one modem), and the gross processing required to perform computationally expensive tasks, e.g., optimally compress the user data, an executive operating system (OS) was developed.

Timely data service is the driving consideration in the executive. This can be expressed most simply in real-time service latency and quality. Service latency can be expressed in the amount of time required to begin servicing a request and quality can be expressed in the variability of the service latency.

The tasking environment balances three basic types of tasks: high frequency high quality, low frequency medium quality and low quality best effort tasks. High frequency high quality tasks need to complete within a very small real-time window. The low frequency medium quality tasks need to be executed at a particular point in time and within some real-time window. The service latency and frequency of low quality tasks is not particularly important as long as it receives sufficient resources to complete its function. In order to create a balanced system the tasking subsystems are tightly coupled with the data queue mechanisms.

Foreground tasks are event driven from a semaphore signaled from the signal processor. This tasking system preempts all other processing and services these tasks within each of their real-time windows. Flow control is signaled backward through the system by indexing the data queue semaphores.

Temporal tasks (execution based in time) are scheduled on a timer based service queue. This provides moderate real-time quality with fine control when a task is executed. This scheduler mechanism doubles for servicing tasks that are run infrequently.

Background tasks are not particularly real-time sensitive, but do require a significant amount of processor time. They effectively share all time not consumed by the other scheduler queues on a best effort basis. This allows them to perform processing on large or small amounts of data as time permits.

The background tasking system is responsible for the graceful degradation of the system. It provides the balance point between throughput and system latency. When there is little load on the system the service latency is very low. As the load increases the background actually increases operational efficiency to maintain throughput. When heavily loaded the background tasks operate at peak efficiency and evenly distribute resources to all logical links.

If an individual logical link does not require all of its background resources, these resources are freed up for use by the remaining background tasks, allowing them to use substantially more computational resources for a period of time. This allows extremely high throughput for individual links (e.g., if a modem is only transmitting data, then the computational resources allocated for its receiver are redirected to its transmitter resulting in superior compressibility/throughput of the user data).

This set of relationships allows all available cycles to be directed to data compression (a background task responsibility) while maintaining the pinnacle of real-time performance on service related tasks. It allows data introduced by the host to be completely processed through the system in a few milliseconds (the service frequency of the SP) while providing sufficient resources to throughput enhancing processes (compression) to exceed data processing requirements.

In order to improve service latency a just-in-time queuing policy is used. This allows the construction of error correction data frames before the data actually arrives into the modem. Thus data is transmitted with an absolute minimum of store and forward delay. It also allows for the construction of optimal size data frames, thereby increasing line usage efficiency and data throughput.

The elasticity of the system effectively maintains seamless service times for lightly loaded links while providing very substantial resources for heavily loaded links. This elasticity is rebalanced constantly to compensate for the rapidly changing nature of the system load.

Figure 5:
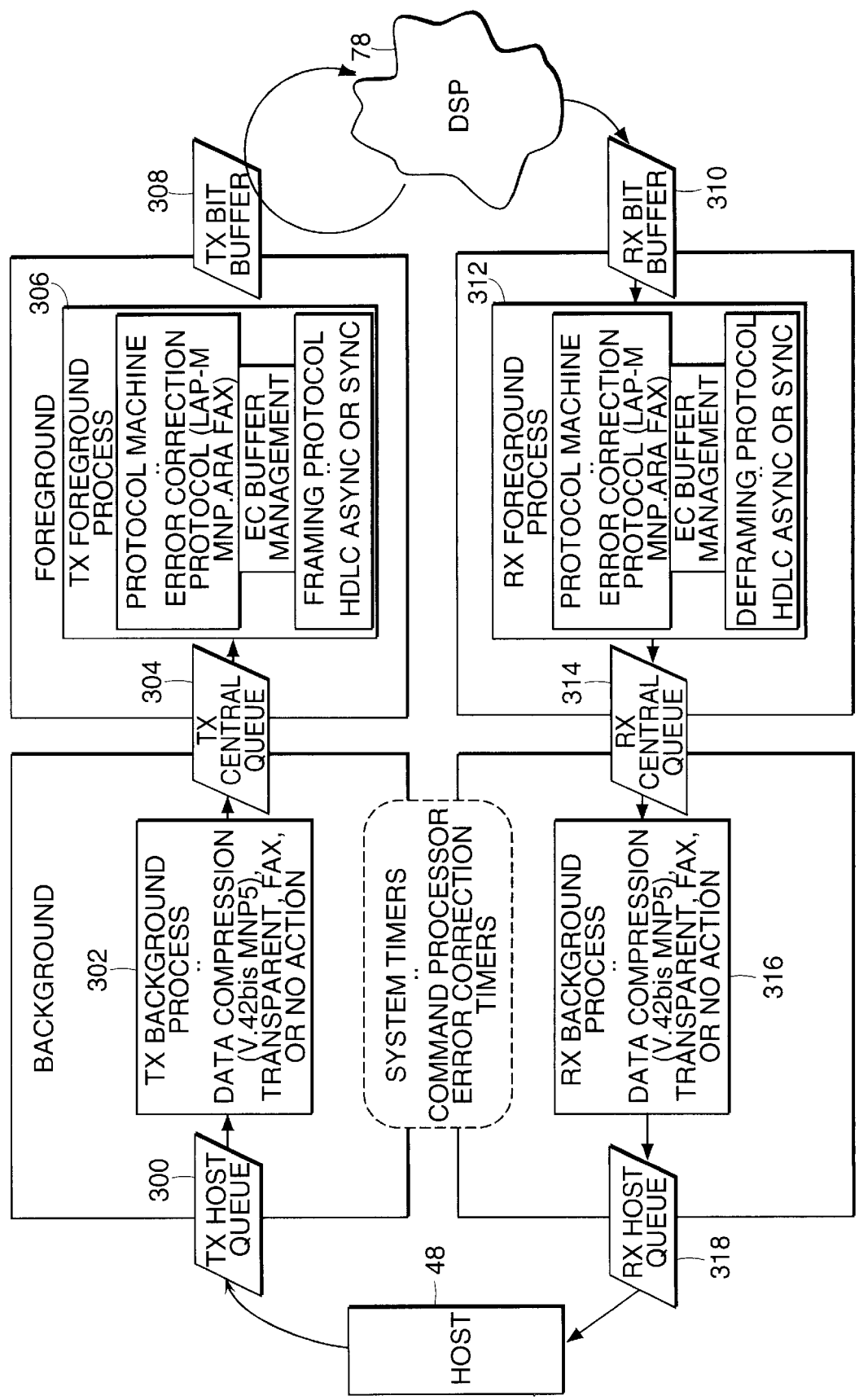
FIG. 5 is a schematic functional diagram illustrating the functional interface between a host and a digital signal processor in accordance with the present invention.

FIG. 5 is a schematic functional block diagram of the functional interface between a host 48 and a DSP 78. Along the transmit side, data from the host is gathered in a transmit host queue 300 and is processed by transmit background tasks 302 such as the tasks listed in box 302. Data is then passed to a transmit central queue 304 which provides the data to transmit foreground tasks 306 such as the tasks listed in box 306. The data is then loaded into a transmit bit buffer 308 which passes the data to the DSP 78.

On the receive side, data from the DSP 78 is loaded into a receive bit buffer 310 from which the receive foreground tasks 312 such as the tasks listed in box 312 receive the data. Data is then loaded into receive central queue 314 from which the receive background tasks 316 such as the tasks listed in box 316 receive the data. The data is then stored in a receive host queue 318 from which the host removes the data as required. System timers 301 such as the command processor error correction timers run simultaneously.

Figure 6A:
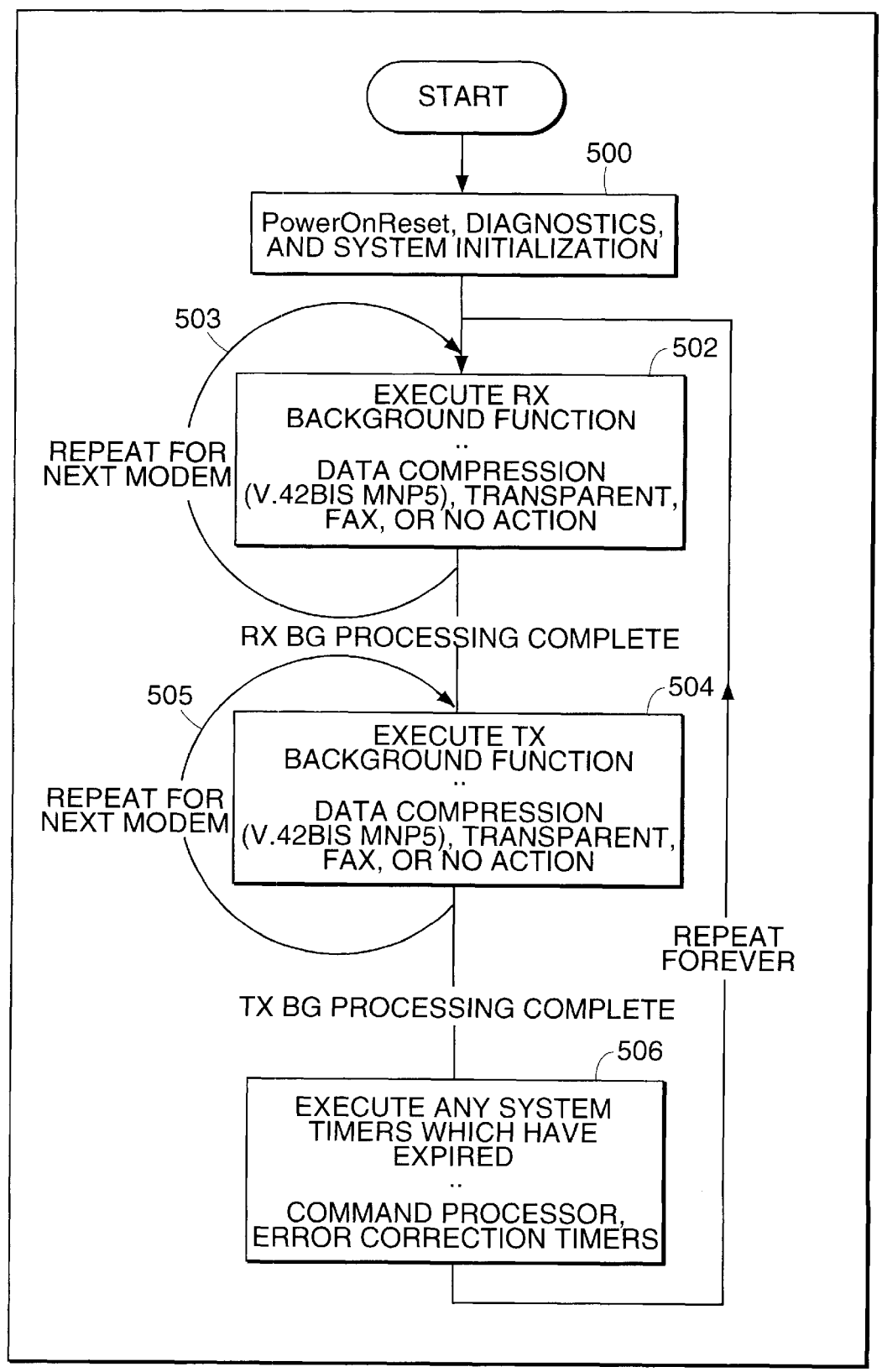
FIGS. 6A and 6B contain flowcharts illustrating the logical flow of a control processor session in accordance with the present invention.
Figure 6B:
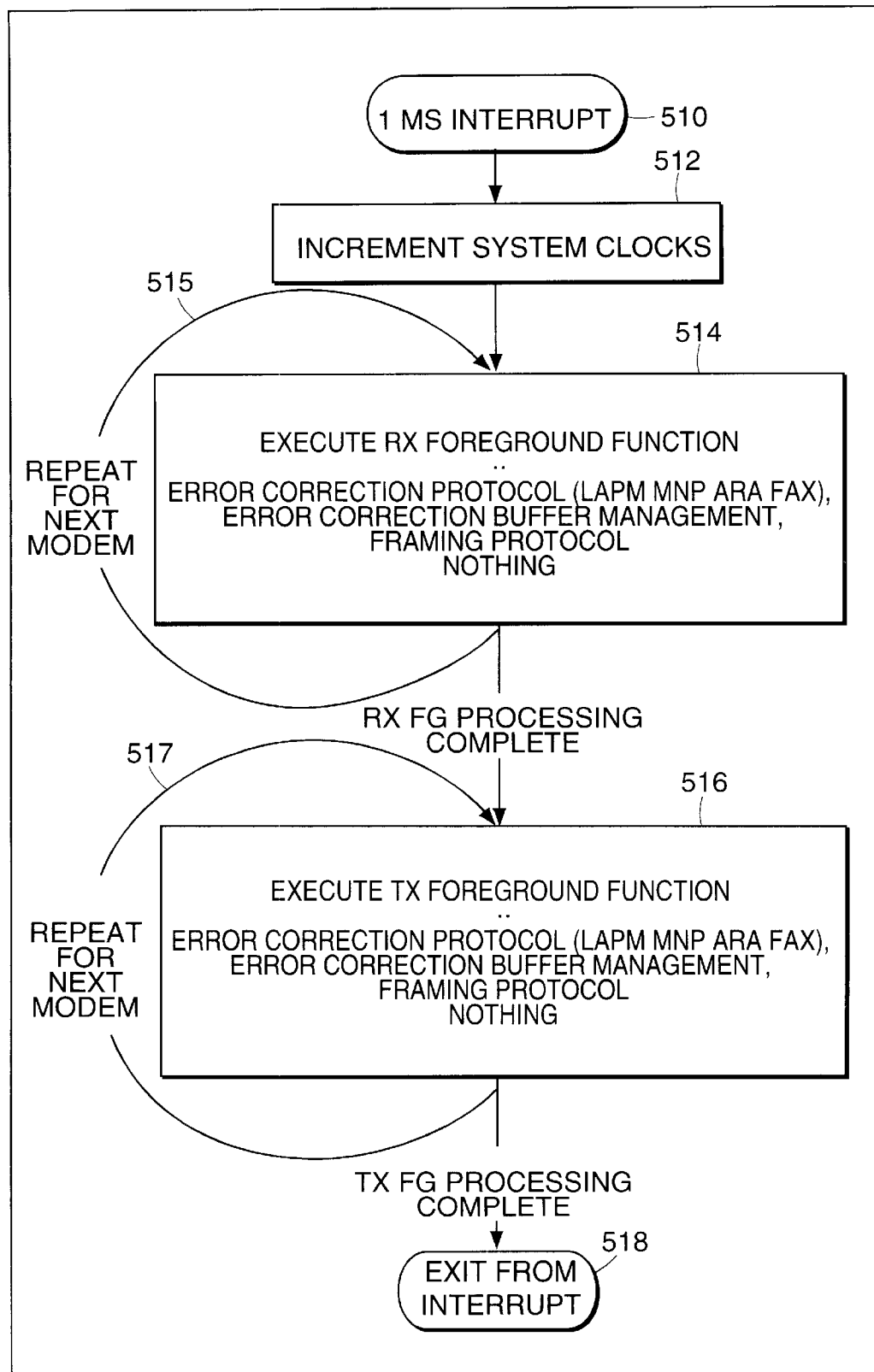

FIG. 6A contains a flowchart for the background function of the control processor of the invention, and FIG. 6B contains a flowchart for the foreground function. During a CP session, the background function executes as shown in FIG. 6A. A periodic interrupt is issued to implement the foreground processing shown in FIG. 6B. In one embodiment the interrupt occurs every one millisecond.

As shown in FIG. 6A, in the background function, in a first step 500, power-on reset, system diagnostics and system initialization are performed. Next, in step 502, the receive background functions are performed. As shown by arrow 503, the receive background function continues until all modems being serviced by the function are completed. As shown in step 502, examples of receive background tasks include the tasks listed in box 502. When the receive background function in step 502 is complete, the transmit background functions are performed in step 504. Examples of the tasks in the transmit background function include the tasks listed in box 504. As shown by arrow 505, the transmit background function continues until all modems in the session have been serviced. After the transmit background function is complete, system timers that may have expired are serviced in step 506, and the flow returns to the receive background function in step 502.

As shown in FIG. 6B, in step 510, a one millisecond interrupt is received to enter the foreground functions. Upon entering the foreground, the system clocks are incremented in step 512. Next, the receive foreground function is executed in step 514. The function can include the tasks listed in box 514. As shown by arrow 515, the receive foreground function is executed until all modems in the session are serviced. Next, the transmit foreground function is executed in step 516. The function can include tasks such as those listed in box 516. As indicated by line 517, the foreground function is executed until all modems in the session are serviced. Finally, the interrupt service is exited at step 518 and flow returns to the background shown in FIG. 6A.

Those skilled in the art will recognize, or be able to ascertain using no more than routine experimentation, many equivalents to the specific embodiments of the invention described herein. Such equivalents are intended to be encompassed by the following claims:

What is claimed is:

1. A modem comprising:
   A) a line interface for coupling the modem to a telephone line;
   B) a computer interface for coupling the modem to a host computer; and
   C) a processing sub-system coupled between the line interface and the computer interface and comprising:
   i) a plurality of digital signal processors that process telephone-call data flowing between the line interface and the computer interface for a plurality of simultaneous telephone calls; and
   ii) common processing circuitry that generates control signals and performs data manipulation on the telephone-call data passing between the computer interface and the digital signal processors for the plurality of simultaneous telephone calls.

2. The modem of claim 1 wherein the telephone line is a primary rate ISDN telephone line.

3. The modem of claim 1 wherein the plurality of simultaneous telephone calls processed by the modem comprise a plurality of digital telephone calls.

4. The modem of claim 1 wherein the plurality of simultaneous telephone calls processed by the modem comprise a plurality of analog telephone calls.

5. The modem of claim 1 wherein the plurality of simultaneous telephone calls processed by the modem comprise a digital telephone call and an analog telephone call.

6. The modem of claim 1 wherein the data manipulation performed by the common processing circuitry includes adding error-correction coding.

7. The modem of claim 1 wherein the data manipulation performed by the common processing circuitry includes detecting errors in accordance with error-correction coding.

8. The modem of claim 1 wherein the data manipulation performed by the common processing circuitry includes framing.

9. The modem of claim 1 wherein the data manipulation performed by the common processing circuitry includes de-framing.

10. The modem of claim 1 wherein the data manipulation performed by the common processing circuitry includes data compression.

11. The modem of claim 1 wherein the data manipulation performed by the common processing circuitry includes data de-compression.

* * * * *